United States Patent
Blum

(10) Patent No.: US 7,630,398 B2
(45) Date of Patent: Dec. 8, 2009

(54) SUBNET INDEPENDENT TRANSPARENT BRIDGE

(75) Inventor: Scott B. Blum, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 498 days.

(21) Appl. No.: 11/330,459

(22) Filed: Jan. 11, 2006

(65) Prior Publication Data

US 2006/0209858 A1    Sep. 21, 2006

Related U.S. Application Data

(62) Division of application No. 09/671,767, filed on Sep. 27, 2000, now abandoned.

(51) Int. Cl.
*H04J 3/16* (2006.01)

(52) U.S. Cl. .................................. 370/466

(58) Field of Classification Search ................. 370/400, 370/401, 464–467; 709/230, 246, 249, 250
See application file for complete search history.

(56) References Cited

U.S. PATENT DOCUMENTS

| | | | |
|---|---|---|---|
| 4,627,052 A | 12/1986 | Hoare et al. | |
| 5,379,296 A | 1/1995 | Johnson et al. | |
| 5,423,002 A | 6/1995 | Hart | |
| 5,485,455 A | 1/1996 | Dobbins et al. | |
| 5,490,252 A | 2/1996 | Macera et al. | |
| 5,550,816 A | 8/1996 | Hardwick et al. | |
| 5,590,313 A * | 12/1996 | Reynolds et al. | 703/26 |
| 5,790,541 A | 8/1998 | Patrick et al. | |
| 6,028,860 A | 2/2000 | Laubach et al. | |
| 6,037,932 A * | 3/2000 | Feinleib | 348/478 |
| 6,157,965 A * | 12/2000 | Mohammed et al. | 710/8 |
| 6,233,618 B1 | 5/2001 | Shannon | |
| 6,243,753 B1 | 6/2001 | Machin et al. | |
| 6,253,334 B1 * | 6/2001 | Amdahl et al. | 714/4 |
| 6,483,812 B1 | 11/2002 | Prorock | |
| 6,590,861 B1 | 7/2003 | Vepa et al. | |
| 6,603,769 B1 | 8/2003 | Thubert et al. | |
| 6,614,764 B1 | 9/2003 | Rodeheffer et al. | |
| 6,621,810 B1 | 9/2003 | Leung | |
| 6,633,929 B1 * | 10/2003 | Hyder et al. | 710/62 |
| 6,636,498 B1 * | 10/2003 | Leung | 370/338 |
| 6,678,734 B1 * | 1/2004 | Haatainen et al. | 709/230 |
| 6,725,311 B1 * | 4/2004 | Joy et al. | 710/305 |
| 6,757,731 B1 * | 6/2004 | Barnes et al. | 709/227 |
| 6,889,258 B1 * | 5/2005 | Liu et al. | 709/245 |

FOREIGN PATENT DOCUMENTS

EP    1161032 A2    5/2001

* cited by examiner

*Primary Examiner*—Dmitry Levitan
(74) *Attorney, Agent, or Firm*—Trop, Pruner & Hu, P.C.

(57) ABSTRACT

A method and apparatus for intelligently bridging a first network and a second network are disclosed. In one embodiment, a protocol independent bridge device driver is bound to a first and a second network interface card device driver in order to access the first and the second network. Then the bridge device driver adaptively derives topology of the first and the second network based on network packets that it receives from the first and the second network. Lastly, the bridge device driver delivers the received network packets based on information contained in the received network packets and the derived topology.

12 Claims, 6 Drawing Sheets

SUBNET INDEPENDENT TRANSPARENT BRIDGE

CROSS-REFERENCE TO RELATED APPLICATIONS

This application is a divisional of U.S. patent application Ser. No. 09/671,767 entitled "Apparatus for Creating a Photoactive Adhesion Promoter", filed Sep. 27, 2000 now abandoned and assigned to the assignee of the present application.

FIELD OF THE INVENTION

This invention relates to communication technologies generally and particularly to bridging technologies.

BACKGROUND OF THE INVENTION

With families bringing second and third personal computers (hereinafter PCs) into their homes, a method for the computer users in these homes to effectively utilize and share all of their computing resources is becoming increasingly desirable. Home networking is one such solution, and it avails the family members with the following services, but without limitation, printer sharing, simultaneous Internet Access, file sharing, multi-player gaming, etc.

Many home networking technologies exist today, and a number of the technologies seek to take advantage of the readily available infrastructure in a home. For instance, the new Home Phoneline Networking Alliance (hereinafter HomePNA) 2.0 specification, published in December of 1999, enables 10 Mbps networking using a home's existing phone lines and conventional RJ-11 phone jacks. Additionally, open specifications ratified by the HomeRF™ (Radio Frequency) Working Groups utilize 2.4-GHz frequency-hopping technology to enable a wireless home network.

Despite the advantages and the convenience that the aforementioned home networking technologies bring to a home, there lacks a cost-effective mechanism for these technologies to interoperate with one another. FIG. 1 illustrates one prior art configuration that deploys HomePNA and HomeRF technologies. Specifically, primary PC 100 accesses the Internet through its Internet access point 102. Internet access point 102 can be, but not limited to, a cable modem, a digital subscriber line (DSL) modem, a dial-up modem, etc. Then primary PC 100 communicates with second PC 112 via HomePNA Network Interface Card (hereinafter NIC) 106 and HomePNA NIC 110, respectively. Similarly, primary PC 100 communicates with third PC 116 via HomeRF NIC 108 and HomeRF 114, respectively.

Assuming the communications among the NICs are based on Transmission Control Protocol/Internet Protocol (hereinafter TCP/IP), difficulties arise when the operating system on primary PC 100 does not support sharing one network prefix for HomePNA NIC 106 and HomeRF NIC 108. As a result, in order for primary PC 100 to communicate with second PC 112 and third PC 116 directly, HomePNA NIC 106 and HomePNA NIC 110 would be configured to share one network prefix, and HomeRF NIC 108 and HomeRF NIC 114 would be configured to share another. With this configuration, however, second PC 112 cannot communicate with third PC 116 directly. In other words, network packets originated from HomePNA NIC 110 would most likely only reach HomeRF NIC 114 through a router that shares the same network prefix as HomeRF NIC 114.

Furthermore, even though bridging technology exists today to allow communication between one type of network with another, such technology is often embodied in a standalone apparatus. Not only is modifying a hardware bridge to accommodate new technologies or specifications nontrivial, but a hardware bridge is also more costly than a software solution that utilizes available PC resources.

Therefore, a method and apparatus is needed to overcome the described operating system limitations and to enable integration between two or more different networking technologies cost effectively.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and an apparatus for intelligently bridging a first network and a second network are disclosed. In the following paragraphs, numerous specific details are set forth in order to provide a thorough understanding of the present invention. However, it will be apparent to one of ordinary skill in the art that the invention may be practiced without these particular details. In other instances, well-known elements and theories, such as Transmission Control Protocol/Internet Protocol (hereinafter TCP/IP), NetBios Enhanced User Interface (hereinafter Netbeui) Protocol, Internetwork Packet Exchange (hereinafter IPX) Protocol, Institute of Electrical and Electronics Engineers (hereinafter IEEE) 802 standards, Ethernet IP addressing schemes, Peripheral Component Interconnect (hereinafter PCI), Universal Serial Bus (hereinafter USB), operating systems, kernel mode, user mode, device driver, Open Systems Interconnection (hereinafter OSI) Reference Model, Network Driver Interface Specification (hereinafter NDIS), etc. have not been discussed in special details in order to avoid obscuring the present invention.

Moreover, throughout the following discussions, a network interface card (hereinafter NIC) can be, but not limited to, a PCI or a USB expansion board, a semiconductor device that has been integrated into a computer system's motherboard and provides network connectivity functionality or a credit-card size peripheral device, etc. The term, "intermediate driver", refers to a driver that interfaces with an upper-level driver and a lower-level driver. A protocol driver that implements layers of a network protocol stack is one example of an upper-level driver. On the other hand, a miniport driver that implements device-specific operations for a NIC is an example of a lower-level driver. Also, the terms, "protocol stack" and "network stack", are used interchangeably to broadly refer to a hierarchy of protocol layers or levels that provide appropriate networking functions. For example, the OSI Reference Model describes networking as a series of layers with a specific set of functions allocated to each layer. These layers are (from the lowest level layer to the highest level layer): physical, data link, network, transport, session, presentation and application layers. Each lower-level layer offers certain services to a higher-level layer and shields the higher-level layer from the implementation details of the services. In addition, the term "network topology" broadly refers to descriptions of the accessibility of certain machines or NICs on particular networks. Finally, a machine readable medium refers to, but not limited to, a storage device or a memory device, etc.

Figure 2A:
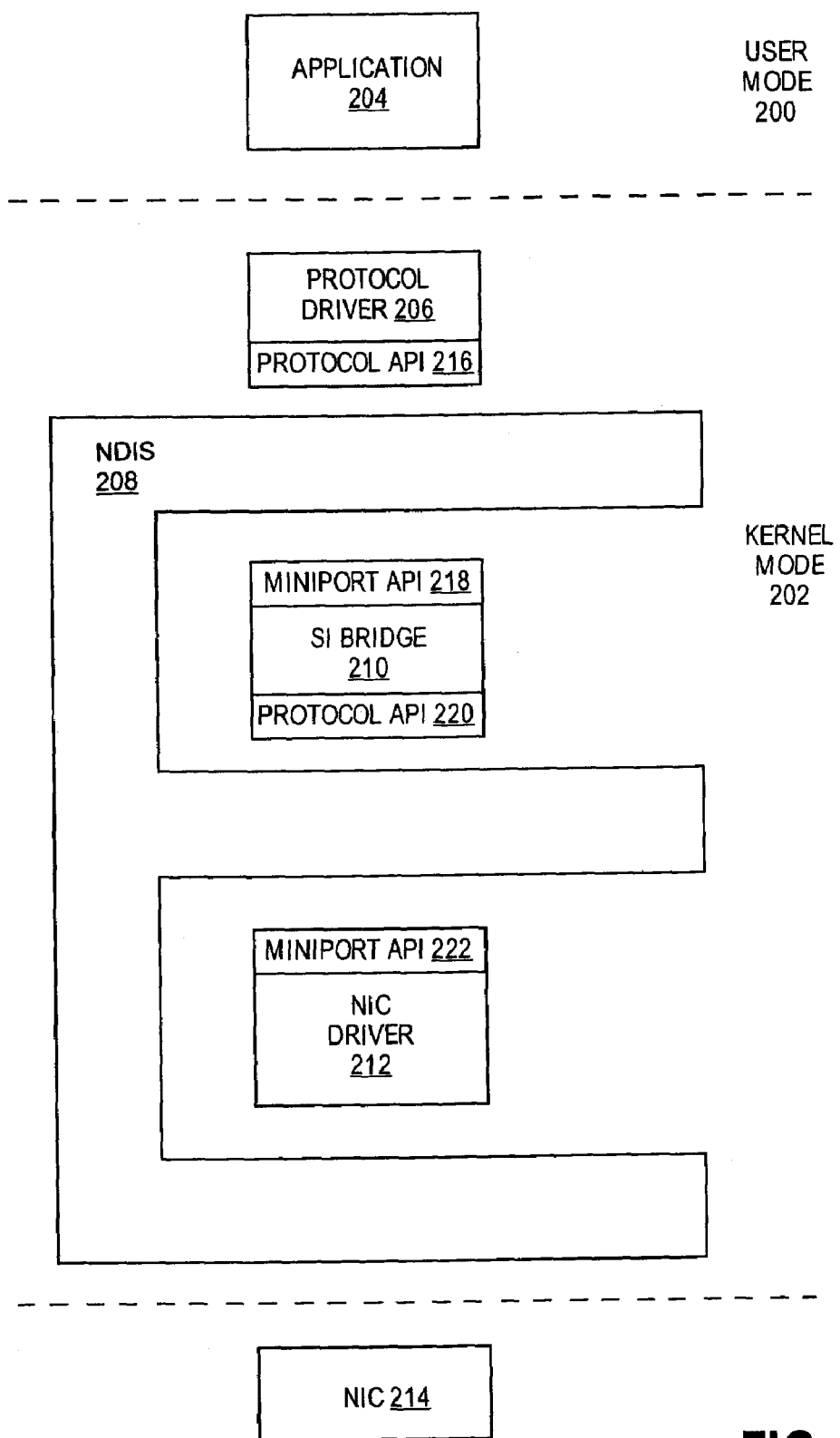
FIG. 2(a) illustrates one embodiment of a subnet independent bridge that utilizes a standardized driver interface.

FIG. 2(a) illustrates one embodiment of present invention, a subnet independent bridge (hereinafter SI bridge). SI bridge utilizes a standardized driver interface. One example of this standardized driver interface is NDIS 208. NDIS abstracts lower-level drivers from upper-level drivers by providing the layered drivers with a library of function calls and by specifying a standard interface between the layered drivers. NDIS 208 also maintains state information and parameters for the drivers, including pointers to functions, parameter blocks for linkage, handles and other system values. The structure that utilizes the NDIS interface 208 shown in FIG. 2(a) mainly operates in two levels: user level 200 and kernel level 202. More particularly, application 204, such as Internet browser, operates in user level 200. SI bridge 210, NIC driver 212 and protocol driver 206, which implements the transport layer of a protocol stack, such as a TCP/IP, an IPX or a Netbeui stack, operate in kernel mode 202.

In addition to calling NDIS 208 provided functions (i.e. NdisXxx functions), protocol driver 206 also provides NDIS 208 with protocol Application Programming Interface (hereinafter API) 216. Specifically, protocol driver 206 exports a set of ProtocolXxx functions that NDIS 208 can invoke either for its own purpose or on behalf of lower-level drivers, such as SI bridge 210 and NIC driver 212. In a similar fashion, NIC driver 212 communicates with NIC 214 by invoking NdisXxx functions. In order to allow NDIS 208 to access NIC driver 212 either for its own purpose or on behalf of higher-level drivers, such as SI bridge 210 and protocol driver 206, NIC driver 212 also provides NDIS 208 with an API, miniport API 222 (i.e. MiniportXxx functions).

Because of its intermediate position in the hierarchy as shown in FIG. 2(a), SI bridge 210 provides protocol API 220 at its lower edge and miniport API 218 at its higher edge to avoid disrupting the operations of the components in this hierarchy. More particularly, SI bridge 210's protocol API 220 permits NDIS 208 to communicate requests from NIC driver 212 to SI bridge 210. To NIC driver 212, SI bridge 210 is no different than protocol driver 206, and the inclusion of SI bridge 210 thus does not alter NIC driver 212's operations. Similarly, NDIS 208, either for its own purpose or on behalf of higher-level driver such as protocol driver 206, is able to access SI bridge 210 through miniport API 218. As a result, SI bridge 210 appears to be NIC driver 212 from the perspective of protocol driver 206, and protocol driver 206 can therefore continue to operate in a same matter. In other words, SI bridge 210 is "transparent" to both protocol driver 206 and NIC driver 212.

Figure 2B:
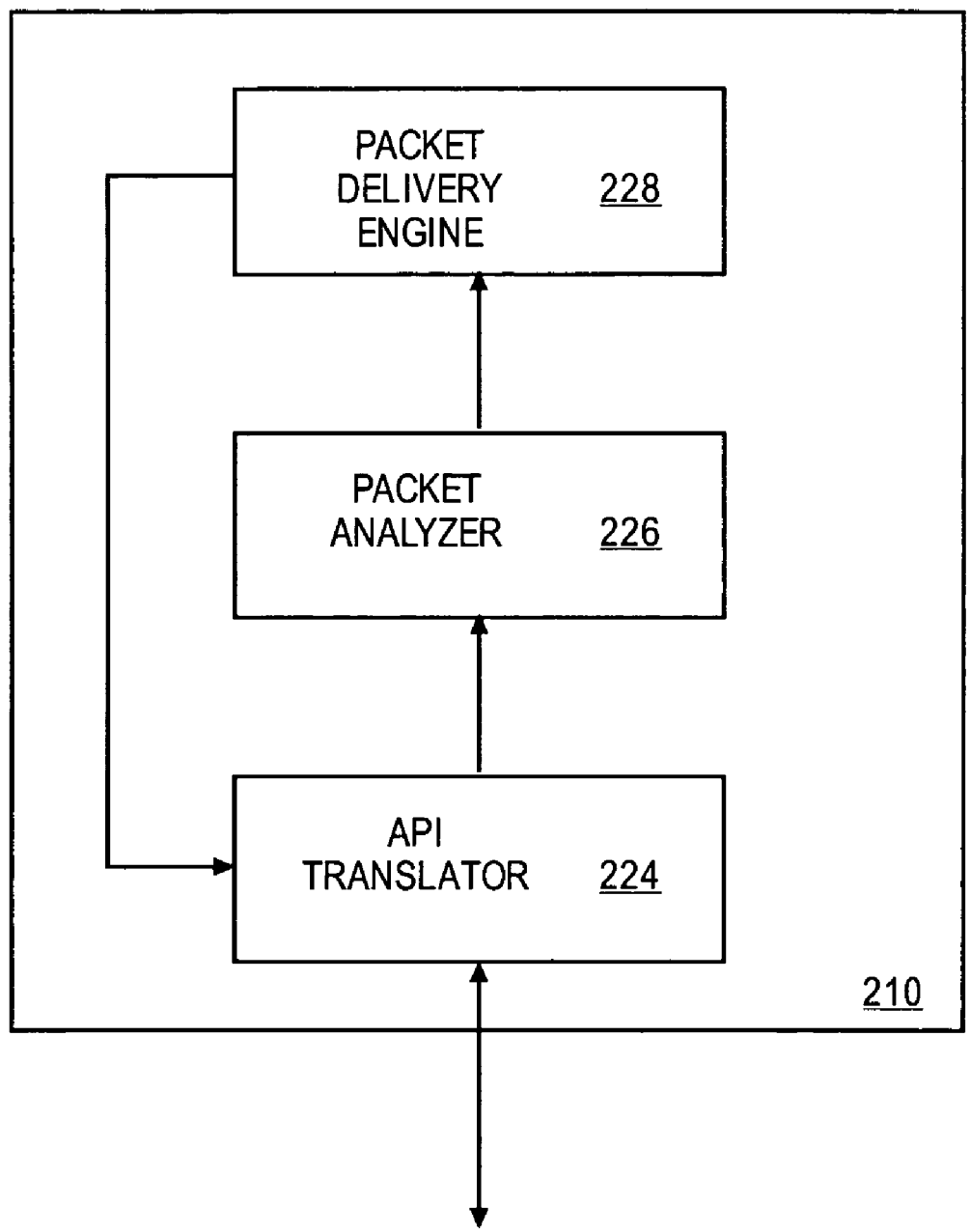
FIG. 2(b) illustrates a functional block diagram of one embodiment of a subnet independent bridge.

Moreover, FIG. 2(b) illustrates a functional block diagram of one embodiment of a SI bridge. Specifically, SI bridge 210 contains API translator 224, packet analyzer 226 and packet delivery engine 228. API translator 224 is responsible for providing APIs to and interpreting requests from components that are external to SI bridge 210. Using FIG. 2(a) as an illustration, API translator 224 exposes miniport API 218 and protocol API 220 to NDIS 208, protocol driver 206 and NIC driver 212. In a situation where protocol driver 206 intends to send packets or requests to NIC driver 212, NDIS 208 invokes MiniportXxx functions of miniport API 218 on behalf of protocol driver 206 to send such packets or requests to SI bridge 210. API translator 224 interprets these function calls and invokes corresponding NDISXxx function calls to propagate these packets and requests to NIC driver 212.

On the other hand, when NIC driver 212 intends to send up its status, received packets or responded requests to protocol driver 206, NDIS 208 invokes ProtocolXxx functions of protocol API 220 on behalf of NIC driver 212 to send up the information. API translator 224 maps these ProtocolXxx function calls into appropriate NDISXxx function calls and invokes these mapped NDISXxx functions to relay the information to protocol driver 206.

Packet analyzer 226 and packet delivery engine 228 are responsible for monitoring and updating network topology information and intelligently delivering network packets to appropriate destinations. In one embodiment, packet analyzer 226 parses the network packets that SI bridge 210 receives, extracts appropriate information contained in the network packets and based on this extracted information, constructs a distribution table that describes how SI bridge 210 should deliver the packets that it receives. For example, one implementation of packet analyzer 226 extracts source address X of a network packet that SI bridge 210 receives from network Z. According to the source address and network information, SI bridge 210 identifies NIC Y to be the sender of this network packet, and NIC Y is reachable on network Z. Then packet analyzer 226 makes an entry in the distribution table indicating that subsequent network packets that are destined for NIC Y should use network Z.

Because network topology may change as components are added, removed or powered up and down on networks, one embodiment of packet analyzer 226 also records the arrival time of the received network packets in the distribution table. Whenever the source address of the received network packet has already been noted in the distribution table, packet analyzer 226 only updates the arrival time. Thus, the time recorded in the distribution table indicates the last time that SI bridge 210 receives a network packet from a particular NIC. Then packet analyzer 226 can periodically purge entries in the distribution table that have remained unchanged for more than a predetermined amount of time. Alternatively, packet analyzer can compile statistics of the network packets that it analyzes, such as the frequently of a particular NIC sends a packet to SI bridge 210, and dynamically modifies its purging mechanism based on such compiled statistics.

In addition to extracting source address information, one embodiment of packet analyzer 226 also parses out destination address and packet type information for packet delivery engine 228. As has been mentioned before, packet delivery engine 228 is responsible for forwarding network packets that SI bridge 210 has received to suitable destinations. One embodiment of packet delivery engine 228 determines these suitable destinations based on the parsed information from packet analyzer 226 and also the information contained in the aforementioned distribution table. Subsequent paragraphs will discuss this determination process in more details. Also, one embodiment of packet delivery engine 228 interfaces with API translator 224, where API translator 224 invokes the appropriate function calls, such as NDISXxx function calls, to further facilitate the delivery of network packets to the destined NIC(s).

It is important to emphasize that although the preceding paragraphs describe SI bridge 210 specifically in conjunction with a standardized driver interface, such as NDIS, it should be apparent to one with ordinary skill in the art to design SI bridge 210 to interoperate with other driver interfaces. Moreover, it should also be apparent to one ordinarily skilled in the art to combine or further divide up the described functional blocks of SI bridge 210.

Figure 3:
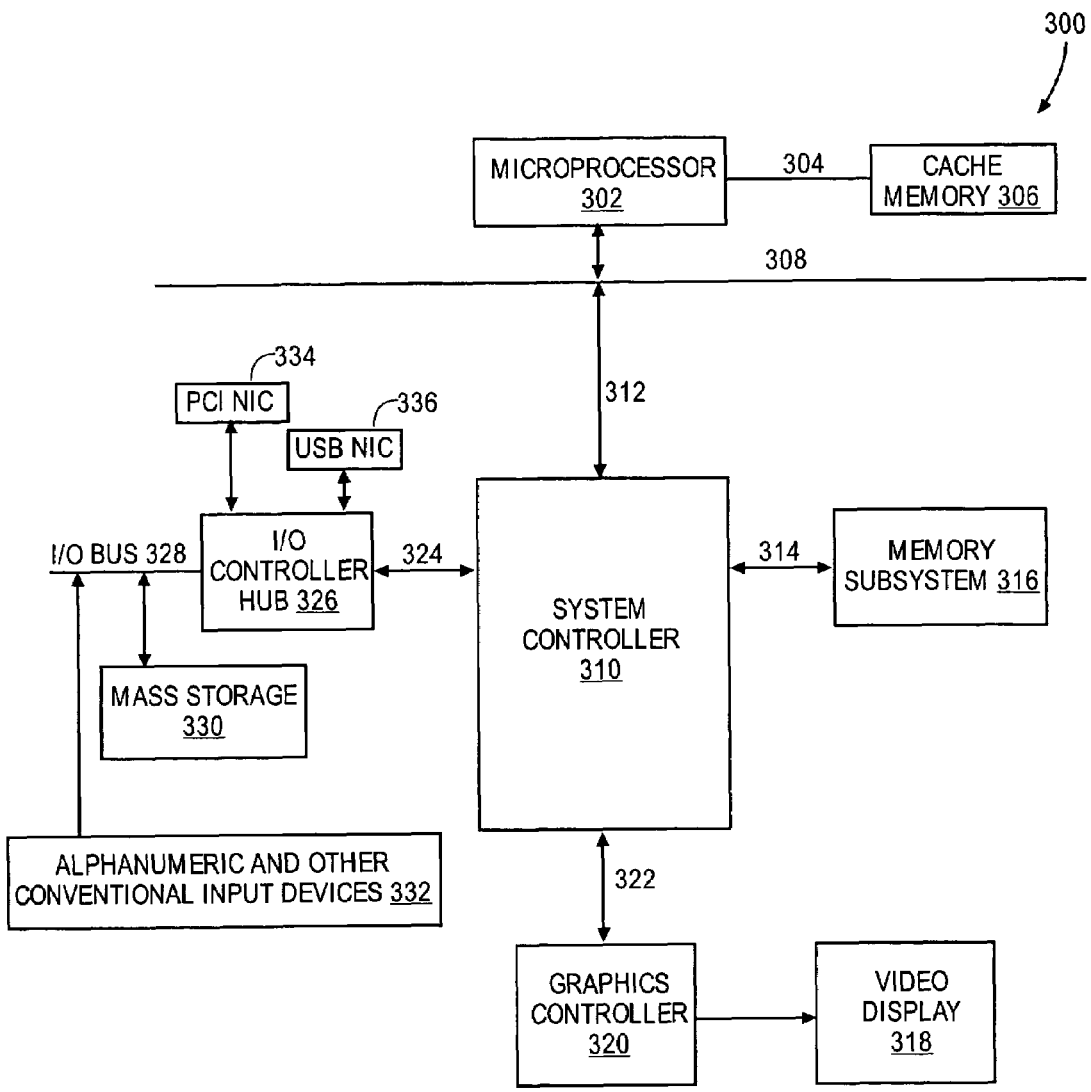
FIG. 3 illustrates a general block diagram of a general-purpose computer system

FIG. 3 illustrates a general block diagram of general-purpose computer system 300 that the discussed SI bridge 210 operates on. It should however be apparent to one ordinarily skilled in the art to implement SI bridge 210 on a number of hardware platforms that are different from general-purpose computer system 300 without exceeding the scope of the present invention. Some examples of the hardware platforms are, but not limited to, an Internet access point apparatus, a game console, etc.

General-purpose computer system 300 comprises microprocessor 302 and cache memory 306 coupled to each other through processor bus 304. Sample computer system 300 also includes high performance system bus 308 and standard I/O bus 328. Coupled to high performance system bus 308 are microprocessor 302 and system controller 310. Additionally, system controller 310 is coupled to memory subsystem 316 through channel 314, is coupled to I/O controller hub 326 through link 324 and is coupled to graphics controller 320 through interface 322. PCI NIC 334 and/or USB NIC 336, which provide sample computer system 300 access to a network, are also coupled to I/O controller hub 326. Coupled to graphics controller is video display 318. Coupled to standard I/O bus 328 are I/O controller hub 326, mass storage 330 and alphanumeric input device or other conventional input device 332.

These elements perform their conventional functions well known in the art. Moreover, it should have been apparent to one ordinarily skilled in the art that computer system 300 could be designed with multiple microprocessors 302 and may have more components than that which is shown. Also, mass storage 330 may be used to provide permanent storage for the executable instructions of SI bridge 210 in one embodiment. On the other hand, memory subsystem 316 may be used to temporarily store the executable instructions during execution by microprocessor 302.

Operation of One Embodiment of a SI Bridge

Figure 4:
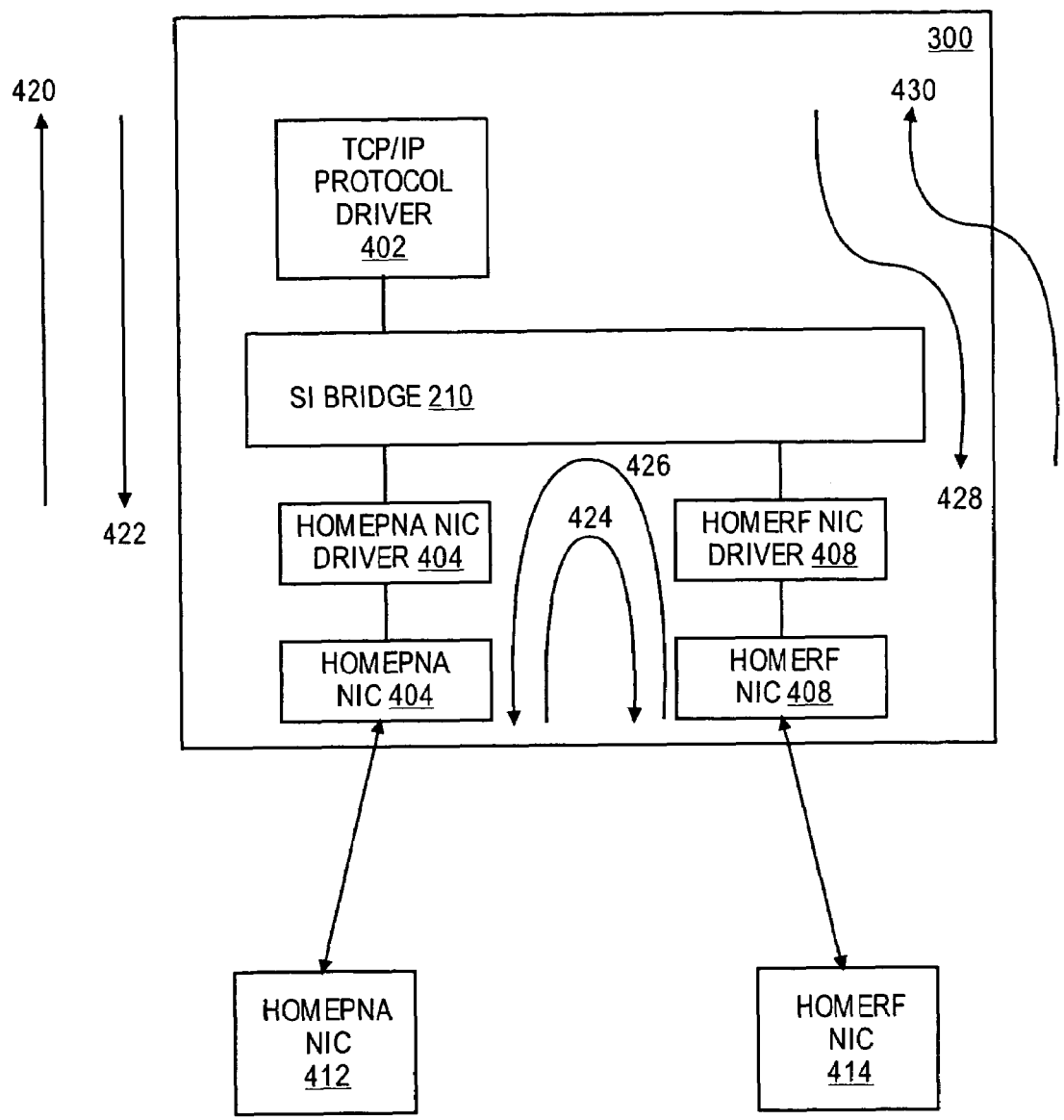
FIG. 4 illustrates an application of one embodiment of a SI bridge in a home networking configuration.

FIG. 4 illustrates an application of one embodiment of a SI bridge in a home networking configuration. Specifically, SI bridge 210 as shown in FIG. 2(a) and 2(b) operates on general-purpose computer system 300 as shown in FIG. 3. SI bridge 210 is bound to multiple NICs, such as HomePNA NIC 406 and HomeRF NIC 410 through HomePNA NIC driver 404 and HomeRF NIC driver 408, respectively. As has been discussed in the Background section, HomePNA technology enables 10 Mbps networking using convention home phone lines and RJ-11 phone jacks. HomeRF technology, on the other hand, enables a wireless home network. Also, SI bridge 210 is bound to TCP/IP protocol driver 402.

Furthermore, since only HomePNA NIC 406 is bound to both SI bridge 210 and TCP/IP protocol driver 402, HomePNA NIC 406 has its own unique IP address and serves as the primary NIC for general-purpose computer system 300. Consequently, the Media Access Control (hereinafter MAC) address of HomePNA NIC 406 not only becomes the source address for its network packets, but also becomes the source address for the network packets that are originated from secondary NICs, such as HomeRF NIC 410. Unlike HomePNA NIC 406, HomeRF NIC 410 is not bound to a protocol driver and does not need to have its own IP address.

Figure 1:
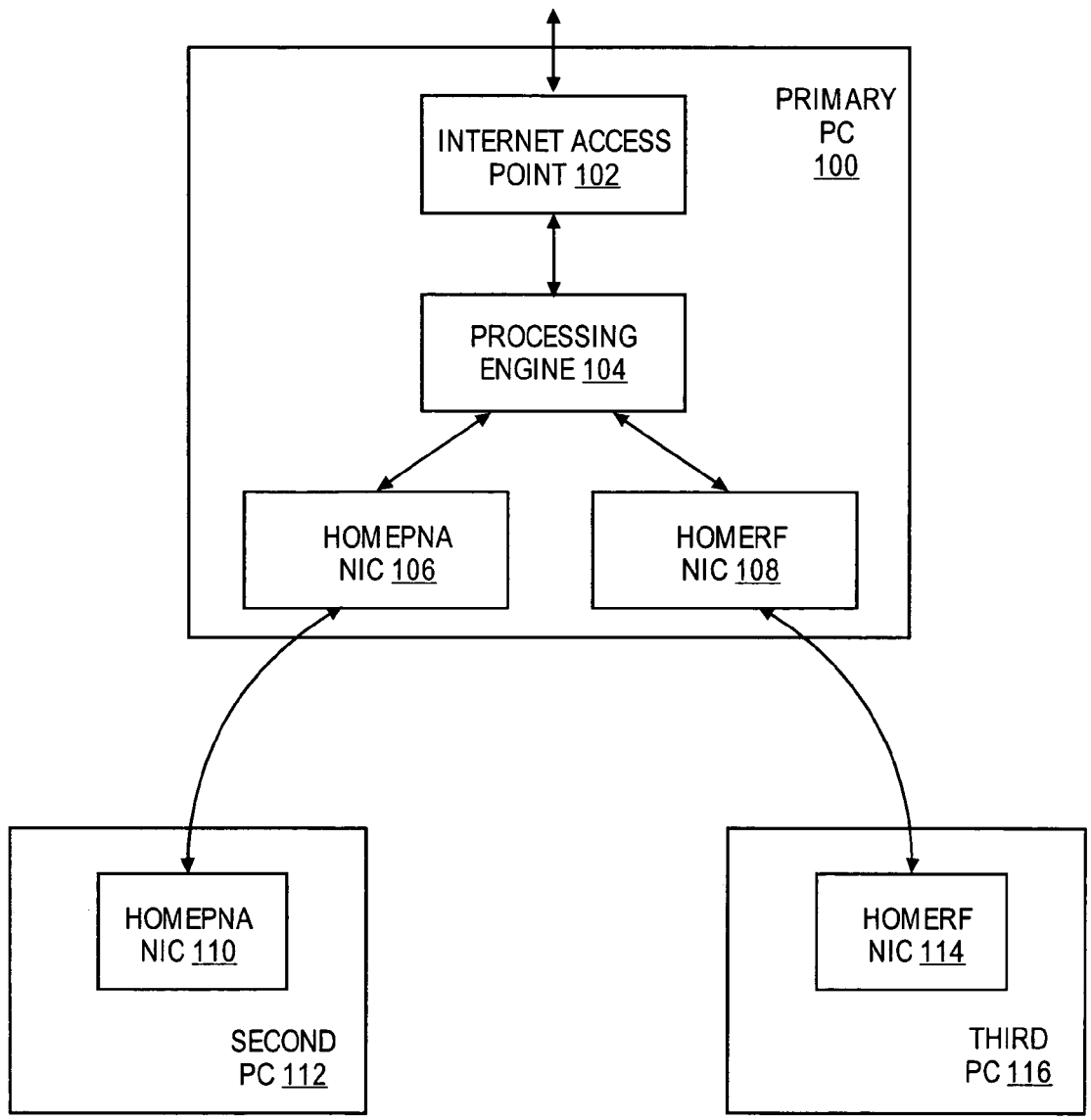
FIG. 1 illustrates one prior art configuration that deploys HomePNA and HomeRF technologies.

It is important to note that SI bridge 210 is protocol independent. In contrast to the network prefix limitation that the prior art configuration as described in the Background section and in FIG. 1 faces, SI bridge 210 eliminates the limitation by not forwarding network packets based on IP addresses. As a specific example, for network packets that conform to IEEE 802.3 standard, when SI bridge 210 receives such network packets, it looks at information contained in the packets, such as their source MAC address and destination MAC address information. Then, SI bridge 210 either passes the network packets up to upper layers of a protocol stack, such as TCP/IP protocol driver 402, or passes the packets laterally from one NIC, such as HomePNA NIC 406, to another NIC, such as HomeRF NIC 410. FIG. 4 also illustrates six paths for network traffic. They are paths 420, 422, 424, 426, 428 and 430.

Figure 5:
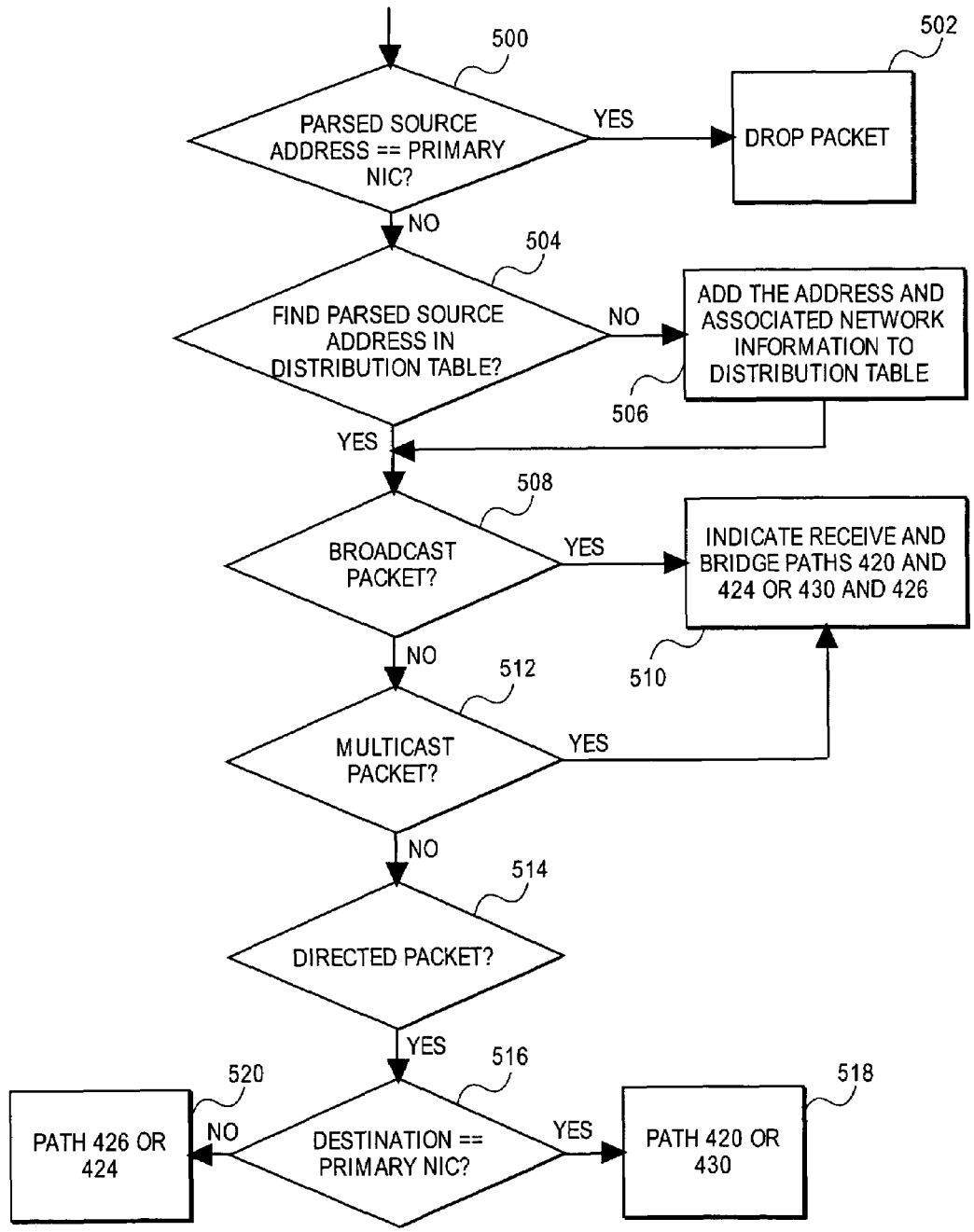
FIG. 5 illustrates a flow chart of one process that one embodiment of a packet delivery engine follows.

FIG. 5 illustrates a flow chart of one process that one embodiment of packet delivery engine 228 follows. In conjunction with FIG. 4 and assuming the following:

1. SI bridge 210 has already received a network packet;
2. Packet analyzer 226 has already constructed a distribution table;
3. Packet analyzer 226 has already parsed out relevant information of the received network packet; and
4. SI bridge 210 instructs NIC drivers, such as HomePNA NIC driver 404 and HomeRF NIC driver 408, to operate in a promiscuous mode. SI bridge 210 can then see network packets on every network that it is coupled to.

In block 500, packet delivery engine 228 verifies whether the parsed source address belongs to the designated primary NIC, or HomePNA NIC 406 in the embodiment illustrated in FIG. 4. If the verification indicates that HomePNA NIC 406 has received its own network packet, this packet is dropped in block 502. Packet delivery engine 228 then waits to process the next network packet. However, if the verification returns false, packet delivery engine 228 searches the aforementioned distribution table for entries that match the parsed source address in block 504. If packet delivery engine 228 could not identify any entries that match, it proceeds to add the unmatched source address information along with other associated network information to the table in block 506. "Other associated network information" here includes, but not limited to, the associated NIC that generates the network packet, the network that the associated NIC attaches to, the time the network packet arrives at, etc. Either after updating the distribution table in block 506 or locating a matching entry in block 504, packet delivery engine 228 proceeds further to establish delivery paths for the network packet.

If packet delivery engine 228 determines that the network packet is a broadcast packet in block 508, where such type of packet is destined for all entities on a network, it then ensures the broadcast packet would travel on either receiving paths 420 and 424 or 430 and 426 in block 510. For example, when HomePNA NIC 412 sends out a broadcast packet, this network packet would travel via path 420 to reach the upper layers of general-purpose computer system 300's protocol stack through HomePNA NIC 406, HomePNA NIC driver 404, SI bridge 210 and TCP/IP protocol driver 402. Additionally, SI bridge 210 would also transport this broadcast packet laterally to HomeRF NIC 414 through path 424 and through HomeRF NIC driver 408 and HomeRF NIC 410. Similarly, network packets originated from HomeRF NIC 414 can reach upper layers of general-purpose computer system 300's protocol stack via path 430 and can directly reach HomePNA NIC 412 via path 426.

When the network packet is a multicast packet, instead of a broadcast packet in block 512, packet delivery engine 228 also selects receiving paths 420 and 424 or 430 and 426 for the multicast packet as has been discussed above. A multicast packet is somewhat similar to a broadcast packet, except that it is limited to certain destination addresses. If the network packet is neither a broadcast packet nor a multicast packet, packet delivery engine 228 proceeds to confirm its directed packet type status in block 514. A directed packet refers to a network packet that is destined to a specific, or directed, NIC.

For a confirmed directed packet, if packet delivery engine 228 further establishes that the directed packet is destined for a primary NIC, such as HomePNA NIC 406, in block 516, packet delivery engine 228 chooses receiving path 420 or 430 for the directed packet in block 518. For instance, when HomePNA NIC 412 sends this directed packet for HomePNA NIC 406, path 420 is selected to receive the packet. On the other hand, when HomeRF 414 sends out the directed packet, path 430 is chosen. If the directed packet is not destined for a primary NIC, packet delivery engine 228 instead designates either receiving path 424 or 426 in block 520.

Although specific examples have been provided to illustrate the operations of a SI bridge, one with ordinary skill in the art may implement the illustrated system without all the disclosed details. For example, an ordinary artisan may implement SI bridge 210 to interoperate with more than the two NICs as shown in FIG. 4 and also with other types of NICs than the ones described, such as Ethernet NICs, without exceeding the scope of the present invention. Additionally, an ordinary artisan may also replace TCP/IP protocol driver 402 as shown in FIG. 4 with, but not limited to, an IPX or a Netbeui protocol driver.

Thus, a method and apparatus for intelligently bridging a first network and a second network have been disclosed. Although a SI bridge has been described particularly with reference to the figures, it may appear in any number of electronic apparatuses and network configurations. It is further contemplated that many changes and modifications may be made by one of ordinary skill in the art without departing from the spirit and scope of the present invention.

What is claimed is:

1. A method for bridging a first network and a second network, comprising:
   receiving a network packet from a first network interface card (NIC) of a first computer system coupled to a second computer system, the network packet received from the second computer system;
   invoking a protocol application programming interface (API) operation, the protocol API operation operable to deliver the network packet to an application program executing on the first computer system; and
   translating the protocol API operation into a miniport API operation associated with a second NIC of the first computer system coupled to a third computer system to deliver the network packet to the second NIC and thereafter to the third computer system without first delivering the network packet to the application program, wherein the translating includes using functions provided in a network driver interface specification (NDIS), the NDIS to provide drivers associated with the first and second NICs and a driver associated with the protocol API with a standardized interface with which to communicate, and the translating is performed by a subnet independent (SI) bridge software program (SI bridge).

2. The method of claim 1, further comprising:
   generating and modifying entries of an unmatched source address and associated network information of the received network packet in a distribution table.

3. The method according to claim 2, further comprising:
   filtering the received network packet by comparing a source address of the received network packet to the unmatched source address; and
   delivering the filtered received network packet according to its destination address, packet types and information in the distribution table.

4. The method of claim 1 wherein the first NIC is a HomeRF NIC and the second NIC is a HomePNA NIC.

5. A machine readable medium having stored thereon a set of instructions, which if executed by a machine cause the machine to perform a method comprising:
   receiving a network packet from a first network interface card (NIC) of a first computer system coupled to a second computer system, the network packet received from the second computer system;
   invoking a protocol application programming interface (API) operation, the protocol API operation operable to deliver the network packet to an application program executing on the first computer system;
   translating, by a network protocol independent intermediate driver (bridge driver) that uses a standardized driver interface, the protocol API operation into a miniport API operation associated with a second NIC of the first computer system coupled to a third computer system to deliver the network packet to the second NIC and thereafter to the third computer system without first delivering the network packet to the application program;
   exposing a first API to the standardized driver interface and a protocol driver to enable the standardized driver interface to invoke functions of the first API;
   exposing a second API to the standardized driver interface and first and second NIC drivers to enable the standardized driver interface to invoke functions of the second API; and
   translating instructions from the protocol driver, the standardized driver interface and the first and second NIC drivers, respectively, to effectuate transparency of the bridge driver.

6. The machine readable medium of claim 5 further comprising generating and modifying entries of an unmatched source address and associated network information of the received network packet in a distribution table.

7. The machine readable medium of claim 6 further comprising:
   filtering the received network packet by comparing a source address of the received network packet to the generated entry of unmatched source addresses; and
   delivering the filtered received network packet according to its destination address, packet type and information in the distribution table.

8. The machine readable medium of claim 7, wherein the standardized driver interface adheres to a Network Driver Interface Specification.

9. A computer system, comprising:
   a first network interface card to couple to a first network and a second network interface card to couple to a second network;
   a system controller, coupled to a processor and coupled to an Input/Output controller hub further coupled to the first and the second network interface cards;
   a memory having stored therein a set of instructions, which if executed by the processor, causes the computer system to perform a method comprising:
      receiving a network packet from the first network interface card (NIC) received from the first network;
      invoking a protocol application programming interface (API) operation, the protocol API operation operable to deliver the network packet to an application program executing on the computer system;

translating the protocol API operation into a miniport API operation associated with the second NIC to deliver the network packet to the second NIC and thereafter to the second network without first delivering the network packet to the application program; and a bridge device driver to use a standardized driver interface to translate the protocol API operation into the miniport API operation, and including an API translator to expose a first API to the standardized driver interface to enable the standardized driver interface to invoke functions of the first API and a protocol driver, and to expose a second API to the standardized driver interface to enable the standardized driver interface to invoke functions of the second API and a first and a second driver corresponding to the first and second NICs, and to translate instructions from the protocol driver, the standardized driver interface and the first and the second NIC driver to effectuate transparency of the bridge device driver.

10. The computer system of claim 9, wherein the bridge device driver further comprises a packet analyzer to generate and modify entries of unmatched source addresses and associated network information of the received network packets in a distribution table.

11. The computer system of claim 10, wherein the bridge device driver further comprises a packet delivery engine to filter the received network packet by comparing a source address of the received network packet to the generated entries of unmatched source address and to deliver the filtered received network packet according to their destination address, packet type and information in the distribution table.

12. The computer system of claim 11, wherein the standardized driver interface adheres to a network driver interface specification.

* * * * *